US011294199B2

(12) United States Patent
Kan et al.

(10) Patent No.: US 11,294,199 B2
(45) Date of Patent: Apr. 5, 2022

(54) EYEWEAR

(71) Applicant: Mitsui Chemicals, Inc., Tokyo (JP)

(72) Inventors: Ryuki Kan, Nagoya (JP); Takafumi Ohto, Nagoya (JP); Osamu Masuda, Nagoya (JP)

(73) Assignee: Mitsui Chemicals, Inc., Tokyo (JP)

( * ) Notice: Subject to any disclaimer, the term of this patent is extended or adjusted under 35 U.S.C. 154(b) by 244 days.

(21) Appl. No.: 16/648,701

(22) PCT Filed: Sep. 19, 2018

(86) PCT No.: PCT/JP2018/034540
§ 371 (c)(1),
(2) Date: Mar. 19, 2020

(87) PCT Pub. No.: WO2019/059200
PCT Pub. Date: Mar. 28, 2019

(65) Prior Publication Data
US 2020/0271951 A1    Aug. 27, 2020

(30) Foreign Application Priority Data

Sep. 19, 2017  (JP) .............................. JP2017-178965

(51) Int. Cl.
*G02C 5/00*    (2006.01)
*G02C 7/08*    (2006.01)

(52) U.S. Cl.
CPC ............. *G02C 5/001* (2013.01); *G02C 7/083* (2013.01)

(58) Field of Classification Search
CPC ........ G02C 5/001; G02C 7/083; G02C 11/10; G02C 7/06; G02C 11/00; G02F 1/13; G02B 27/02
See application file for complete search history.

(56) References Cited

U.S. PATENT DOCUMENTS

| 8,517,534 B2* | 8/2013 | Sone .................. G02C 7/06 |
| | | 351/159.4 |
| 10,598,961 B2* | 3/2020 | Shibuya ............... G02F 1/1313 |
| 2004/0212776 A1 | 10/2004 | Spitzer et al. |
| 2010/0177277 A1* | 7/2010 | Kokonaski ............ G02C 5/14 |
| | | 351/159.39 |
| 2014/0028966 A1 | 1/2014 | Blum et al. |
| 2017/0108713 A1 | 4/2017 | Blum |

FOREIGN PATENT DOCUMENTS

| JP | 2015-522842 A | 8/2015 |
| WO | 2004/097462 A2 | 11/2004 |

OTHER PUBLICATIONS

International Search Report from International Application No. PCT/JP2018/034540 dated Dec. 25, 2018.

* cited by examiner

*Primary Examiner* — Tuyen Tra
(74) *Attorney, Agent, or Firm* — Brundidge & Stanger, P.C.

(57) ABSTRACT

This eyewear is provided with: a lens which has an electric element, an electrode of the electric element being disposed at an edge of the lens; a frame which has a control unit for controlling the electric element, and which holds the lens; a conductive wire which has a long conductor surface that extends along and facing such edge, and which is connected to the control unit; and a conductive piece which extends along and facing such edge and which comes into contact with the electrode and the conductor surface.

11 Claims, 5 Drawing Sheets

EYEWEAR

TECHNICAL FIELD

The present invention relates to eyewear.

BACKGROUND ART

Eyewear having a lens including an electric element, such as a liquid crystal lens with a changeable refractive index, driven by application of a driving voltage is under development (see, for example, PTL 1).

A lens used for such eyewear is, for example, cut out from lens blank 400 as illustrated in FIG. 5. Lens blank 400 includes liquid crystal lens 411 and a pair of electrodes 412 at predetermined positions.

It is necessary to dispose liquid crystal lens 411 in front of the user's pupil. Accordingly, cutting line 413 is determined according to the positions of the user's pupils (distance between the pupils), the frame shape of eyewear and the like so that liquid crystal lens 411 is located at a desired position in the cut out lens. After cutting line 413 is determined, a lens is cut out from lens blank 400 along cutting line 413.

CITATION LIST

Patent Literature

PTL 1
Japanese Unexamined Patent Application Publication (Translation of PCT Application) No. 2015-522842

SUMMARY OF INVENTION

Technical Problem

Depending on the position where a lens is cut out from a lens blank, the location of an electrode of a liquid crystal lens at the edge portion of the lens varies. For example, when the lens is cut out from lens blank 400 along second cutting line 414 in place of cutting line 413, the locations of electrodes 412 in the cut out lens are changed. When the location of an electrode of a liquid crystal lens changes, it is necessary to adjust the position of the electrode on the control section side in order to ensure conduction to the control section that controls the liquid crystal lens. That is, it is necessary to change the design of a conductive path between the liquid crystal lens and the control section.

However, since the location of an electrode of a liquid crystal lens at the edge portion of a lens changes depending on the way the lens is cut out from lens blank 400, the location varies greatly. Accordingly, it is inefficient to change the design of a conductive path between a liquid crystal lens and a control section according to the location of an electrode of the liquid crystal lens. Such a problem persists in the case where the lens includes an electric element other than a liquid crystal lens.

The present invention is made in view of such a situation, and an object thereof is to provide eyewear in which conduction between an electric element and a control section is ensured even when the location of an electrode of the electric element varies.

Solution to Problem

Eyewear according to the present invention includes: a lens including an electric element and an edge portion provided with an electrode of the electric element; a frame which includes a control section for controlling the electric element, and which holds the lens; a conductive wire which includes an elongated conductor surface that extends along and faces the edge portion, and which is connected to the control section; and a conductive piece which extends along and facing the edge portion, and which is in contact with the electrode and the conductor surface.

Advantageous Effects of Invention

The present invention is capable of providing eyewear in which conduction between an electric element and a control section is ensured even when the location of an electrode of the electric element varies.

DESCRIPTION OF EMBODIMENTS

Hereinafter, embodiments of the present invention will be described in detail with reference to the drawings. In the following description, electronic glasses having a transparent lens for vision correction that has a liquid crystal lens (electroactive region) whose optical characteristics can be changed by electrical control will be described as a representative example of eyewear according to the present invention.

Figure 1:
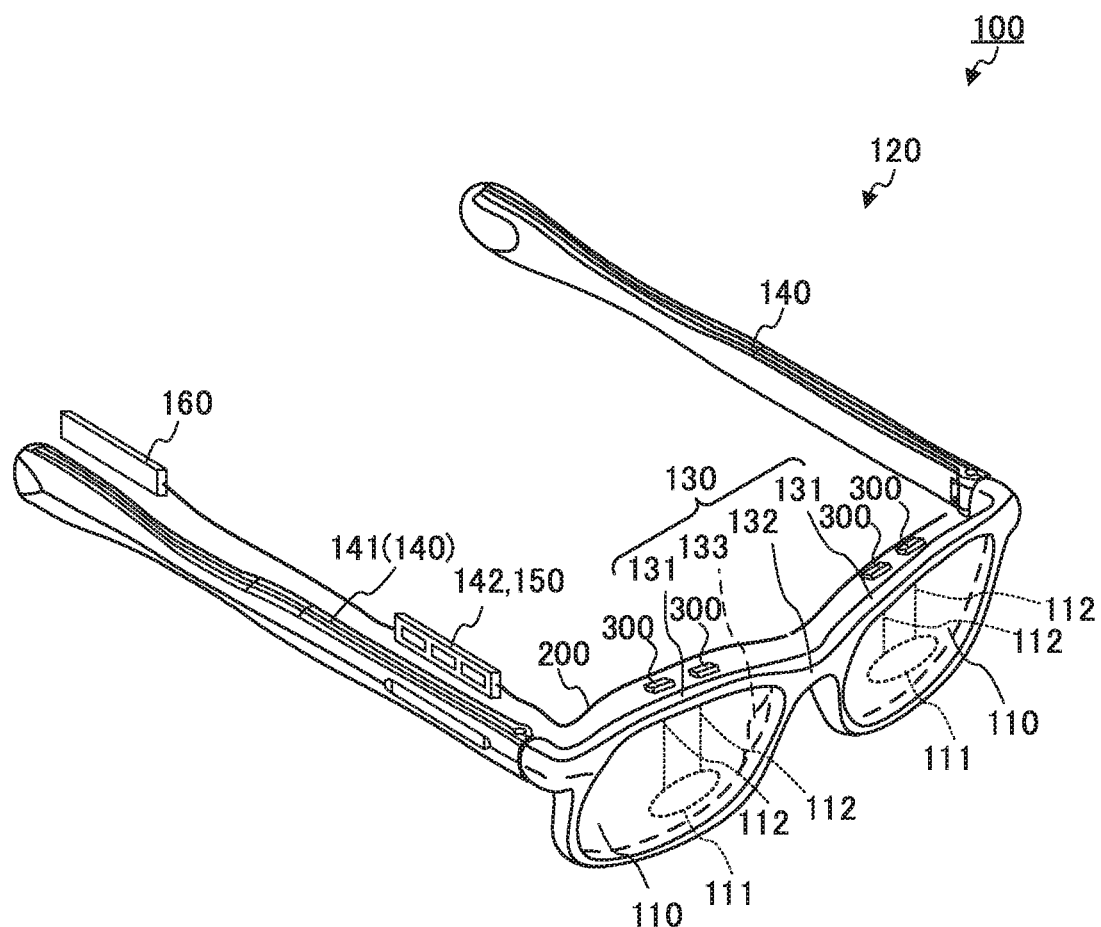
FIG. 1 is a perspective view illustrating electronic glasses according to an embodiment.

FIG. 1 is a perspective view illustrating an example of the configuration of electronic glasses 100 according to the present embodiment. Electronic glasses 100 have a pair of lenses 110 and frame 120. Frame 120 includes front 130 and a pair of temples 140. The following description will be made with the side on which front 130 is located referred to as the front side of electronic glasses 100 and lenses 110, and the side on which temples 140 are located referred to as the rear side of electronic glasses 100 and lenses 110. FIG. 1 illustrates the periphery of temple 140 for a right side and front 130 as a partially exploded view.

The pair of lenses 110 are formed so as to be substantially symmetric when electronic glasses 100 are viewed from the front, and lenses 110 have the same components. In addition, the peripheral structures of lenses 110 are the same. As the details will be described below, lens 110 for a right eye (first lens) and the peripheral structure thereof in electronic glasses 100 will be described in the following description, and the description for lens 110 for a left eye (second lens) and the peripheral structure thereof will be omitted.

Lens 110 includes liquid crystal lens 111 and a pair of electrodes 112. A transparent electrode such as ITO is used as electrode 112.

Figure 2:
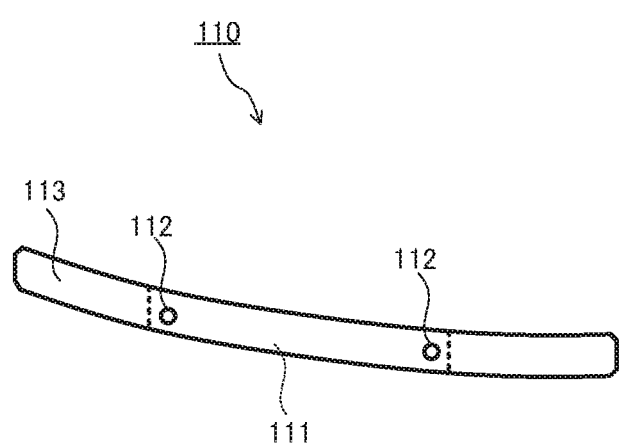
FIG. 2 is a plan view of a lens.

FIG. 2 is a plan view of lens 110 for a right eye. Lens 110 has a multilayer structure in which a plurality of layers are stacked in the thickness direction of lens 110, and includes a pair of conductive layers (not shown) holding a liquid crystal layer (not shown) therebetween from the front and rear at a portion that includes liquid crystal lens 111. The pair of conductive layers are connected to electrodes 112, respectively. Applying a voltage between the pair of the conductive layers via electrodes 112 activates the liquid crystal layer, thereby changing the refractive index of liquid crystal lens 111.

Lens 110 is formed by being cut out from a lens blank so as to have a shape that matches the shape of rim 131 (FIG. 1) described below.

End portions of the pair of electrodes 112 are exposed and disposed at edge portion 113 surrounding the outer periphery of lens 110. Electrodes 112 are disposed apart from each other in the thickness direction of lens 110 by the thickness of the liquid crystal layer. The locations of electrodes 112 and the distance therebetween change depending on the lens blank from which lens 110 is cut out and the cutout position on the lens blank. The distance between electrodes 112 is generally 10 to 21 mm in the direction along edge portion 113.

By referring to FIG. 1 again, frame 120 and the periphery thereof will be described. Front 130 constituting frame 120 includes a pair of rims 131 that respectively hold a pair of lenses 110, and bridge 132 that connects the pair of rims 131 to each other. Front 130 has a pair of nose pads 133 that can contact a wearer's nose.

The material of front 130 is not particularly limited, and is appropriately selected from, for example, metals such as titanium, aluminum and stainless steel, resins such as polyamide, acetate, celluloid, polyetherimide and polyurethane, and carbon.

The pair of temples 140 constituting a part of frame 120 are formed so as to have outer shapes that are substantially symmetrical. Temple 140 for a right side includes built-in control section 150 and power source 160. Hereinafter, temple 140 for a right side will be described, and the description of temple 140 for a left side will be omitted. Temple 140 for a left side may include built-in control section 150 and power source 160.

Temple 140 is rotatably attached at the front end thereof to front 130 via a hinge.

Temple 140 includes housing 141 that houses detection section 142, control section 150, power source 160, and a part of flexible substrate (also referred to as a flexible printed wiring board or FPC) 200.

Housing 141 defines the outer shape of temple 140. Housing 141 extends along one direction. The shape of housing 141 is not particularly limited. For a wearer to easily recognize the position of detection section 142 by merely touching by hand, housing 141 may be such that a part thereof has a shape different from the other part thereof. In the present embodiment, the shape of one part of housing 141 is different from that of the other parts of housing 141. A projected line is formed on the right side surface of housing 141 (the outer surface of electronic glasses 100). A position corresponding to detection section 142 is formed to have a planar shape on the right side surface of housing 141. This configuration enables a wearer to easily recognize the position where detection section 142 is disposed.

The material of housing 141 is not particularly limited, and is appropriately selected from, for example, metals such as titanium, aluminum and stainless steel, resins such as polyamide, acetate, celluloid, polyetherimide and polyurethane, and carbon. For a wearer to easily recognize the position of detection section 142, housing 141 may be such that a part thereof is formed from a material different from the other part thereof. When metal is used as the material for housing 141, housing 141 are insulated from detection section 142.

Detection section 142 includes, for example, a capacitive detection pad. Any detection pad known in the art to be used as a touch sensor can be used as the detection pad. When an object (such as a wearer's finger) touches a position of the housing 141 corresponding to detection section 142, detection section 142 detects a change in capacitance caused by the contact.

Control section 150 is electrically connected to the detection pad of detection section 142 and liquid crystal lens 111. Control section 150 controls the optical characteristics of liquid crystal lens 111 by controlling a voltage applied to below described liquid crystal lens 111. For example, when detection section 142 detects contact of an object, control section 150 applies a voltage to the pair of liquid crystal lenses 111 or stops the application of the voltage, thereby switching the refractive index of liquid crystal lenses 111. Control section 150 includes a control circuit configured to control, for example, the driving of the detection pad, the detecting of capacitance change in the detection pad, and the applying of a voltage to liquid crystal lens 111. Control section 150 is mounted in detection section 142, for example, in a state such that control section 150 is connected to the detection pad for receiving a detection result regarding a change in capacitance in the detection pad.

Power source 160 supplies electric power to detection section 142, control section 150, and liquid crystal lens 111. Power source 160 may be a rechargeable battery pack detachably held at the other end (rear end) of temple 140. Examples of power source 160 include a nickel-metal hydride rechargeable battery.

Flexible substrate 200 and conductive piece(s) 300 are disposed between front 130 and lens 110. Flexible substrate 200 and conductive pieces 300 constitute conductive paths that electrically connect the pair of electrodes 112 and control section 150.

Figure 3A:
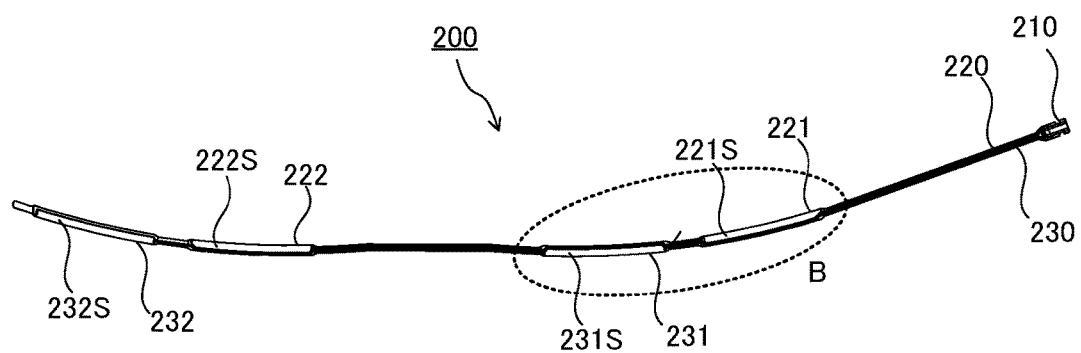
FIG. 3A is a bottom view of a flexible substrate.
Figure 3B:
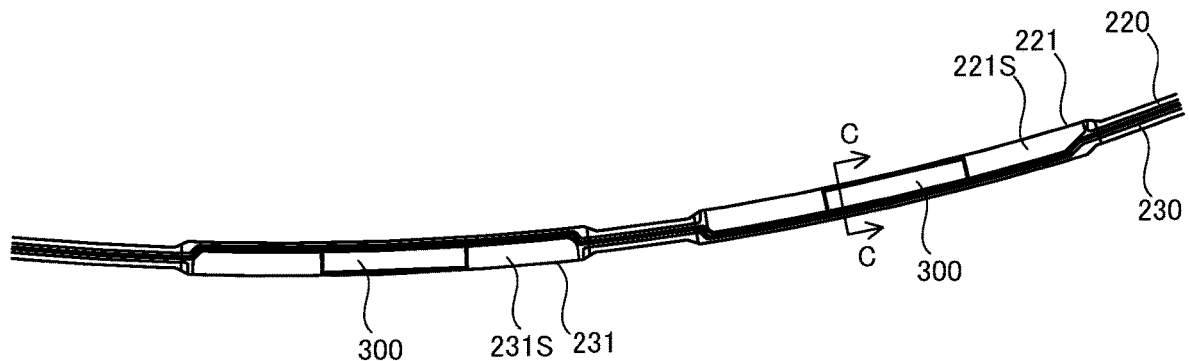
FIG. 3B is a partially enlarged view of the flexible substrate.
Figure 3C:
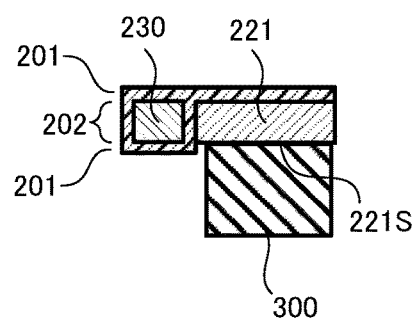
FIG. 3C is a cross-sectional view taken along line C-C of FIG. 3B.

FIG. 3A is a bottom view of flexible substrate 200, FIG. 3B is an enlarged view of a portion indicated by dotted line B in FIG. 3A, and FIG. 3C is a cross-sectional view taken along line C-C of FIG. 3B. FIGS. 3B and 3C also illustrates conductive piece(s) 300.

Flexible substrate 200 has a multilayer structure in which a pair of insulating layers 201 hold conductive wire layer 202 therebetween. Flexible substrate 200 is connected to control section 150 via connection portion 210 provided at one end of flexible substrate 200. Flexible substrate 200 is disposed inside temple 140, between front 130 and lens 110, and inside, under or behind bridge 132 so as to extend along temple 140 and front 130.

The total length of flexible substrate 200 is substantially equal to the sum of the distance between the left and right ends of front 130 and the distance between front 130 and control section 150. The width of flexible substrate 200 is smaller than the width (thickness in the front-rear direction) of front 130 throughout the entire flexible substrate 200. That is, flexible substrate 200 has an elongated shape as a whole. The width of flexible substrate 200 is, for example, 1 mm or more and 5 mm or less.

Insulating layer 201 is formed of a flexible insulating body such as a synthetic resin.

Conductive wire layer 202 is provided with first conductive wire 220 and second conductive wire 230 which are each formed of a conducting body such as copper and which extend substantially parallel to each other. First conductive wire 220 and second conductive wire 230 are insulated from each other. First conductive wire 220 constitutes a conductive path between control section 150 and a conductive layer (i.e., liquid crystal lens 111) which is one of the pair of conductive layers constituting a part of liquid crystal lens 111 and which is disposed on the rear side (user side). Second conductive wire 230 constitutes a conductive path between control section 150 and a conductive layer (i.e., liquid crystal lens 111) which is one of the pair of conductive layers constituting a part of in liquid crystal lens 111 and which is disposed on the front side. The number of conductive wires disposed in conductive layers 202 is in accordance with the number of electrodes 112 disposed at edge portion 113 of lens 110.

First conductive wire 220 has, in parts thereof, first contact forming portion 221 and second contact forming portion 222. In addition, second conductive wire 230 has, in parts thereof, third contact forming portion 231 and fourth contact forming portion 232. Each of these contact forming portions 221 to 232 forms an electrical contact by contacting conductive piece 300.

First contact forming portion 221 and third contact forming portion 231 are connected to the pair of electrodes 112 disposed at edge portion 113 of lens 110 for a right eye via conductive pieces 300, respectively. In addition, second contact forming portion 222 and fourth contact forming portion 232 are connected to the pair of electrodes 112 disposed at edge portion 113 of lens 110 for a left eye via conductive pieces 300, respectively.

First contact forming portion 221, second contact forming portion 222, third contact forming portion 231 and fourth contact forming portion 232 respectively include first elongated conductor surface 221S, second elongated conductor surface 222S, third elongated conductor surface 231S and fourth elongated conductor surface 232S. These elongated conductor surfaces 221S to 232S all extend along and face edge portion 113 of lens 110. These elongated conductor surfaces 221S to 232S all extend with a constant width along edge portion 113 over a predetermined range. In addition, these elongated conductor surfaces 221S to 232S spread over the entire range extending along edge portion 113. In other words, within the range in which each of elongated conductor surfaces 221S to 232S extends along edge portion 113, there is no missing site in each of elongated conductor surfaces 221S to 232S caused by, for example, being provided with a hole or covered with an insulating body.

Flexible substrate 200 configured as described above functions as one cable.

Conductive piece 300 is formed of a material having flexibility and conductivity, such as conductive rubber. Herein, having flexibility means that Young's modulus is small compared to that of lens 110 and front 130. One conductive piece 300 is disposed on each of first elongated conductor surface 221S, second elongated conductor surface 222S, third elongated conductor surface 231S and fourth elongated conductor surface 232S. Conductive piece 300 is attached to each of long conductor surfaces 221S to 232S with, for example, a double-sided tape. During the procedure, the double-sided tape is naturally dimensioned so as not to prevent conduction between conductive piece 300 and each of elongated conductor surfaces 221S to 232S.

In electronic glasses 100 configured as described above, flexible substrate 200 and conductive piece 300 are disposed between front 130 and edge portion 113 of lens 110 and sequentially from the front 130 side. At this time, conductive piece 300 is disposed between lens 110 on the lower side, and front 130 and flexible substrate 200 on the upper side in a state of being slightly compressed from the top and bottom. Accordingly, conductive piece 300 is in close contact with electrode 112 and each of elongated conductor surfaces 221S to 232S, thereby ensuring reliable electrical conduction. In addition, since Young's modulus of conductive piece 300 is smaller than that of lens 110 (that is, conductive piece 300 is flexible), distortion of lens 110 from excessive stress is prevented.

First elongated conductor surface 221S to fourth elongated conductor surface 232S which extend in the direction along edge portion 113 of lens 110 are disposed at positions that face electrodes 112 located at edge portion 113. Accordingly, even when the position where lens 110 is cut out from a lens blank is changed, and thus the position of each electrode 112 at edge portion 113 of lens 110 is changed, each of elongated conductor surfaces 221S to 232S can reliably face each electrode 112. Therefore, electrodes 112 can be electrically connected to contact forming portions 221 to 232 via conductive pieces 300 respectively, without changing the design of flexible substrate 200 and members disposed in the periphery thereof in accordance with the position where lens 110 is cut out from a lens blank.

In addition, each of elongated conductor surfaces 221S to 232S spreads over the entire range where each of elongated conductor surfaces 221S to 232S extends along edge portion 113. In other words, within the range extending along edge portion 113, there is no missing site in each of elongated conductor surfaces 221S to 232S caused by, for example, being provided with a hole or covered with an insulating body. Accordingly, each of elongated conductor surfaces 221S to 232S can achieve conductive contact with conductive piece 300 more reliably and in a wider area. Therefore, more reliable conduction between electrodes 112 and respective contact forming portions 221 to 232 via conductive piece 300 is ensured and power loss when liquid crystal lens 111 drives can be minimized.

Figure 4:
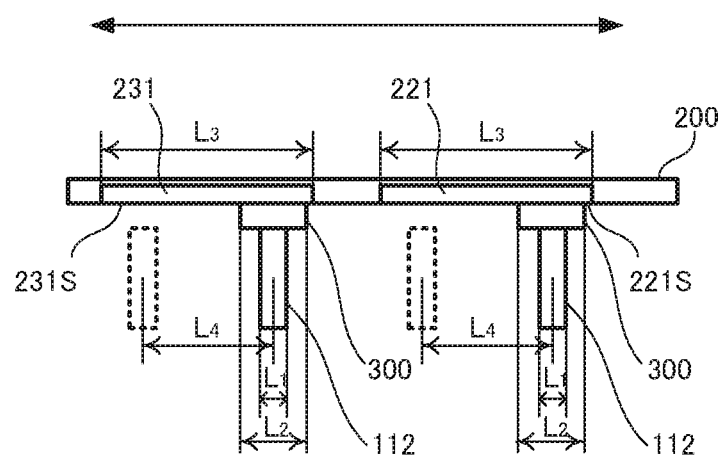
FIG. 4 is a model diagram of relative positions and dimensions of electrodes of a liquid crystal lens, conductive pieces and contact forming portions.
Figure 5:
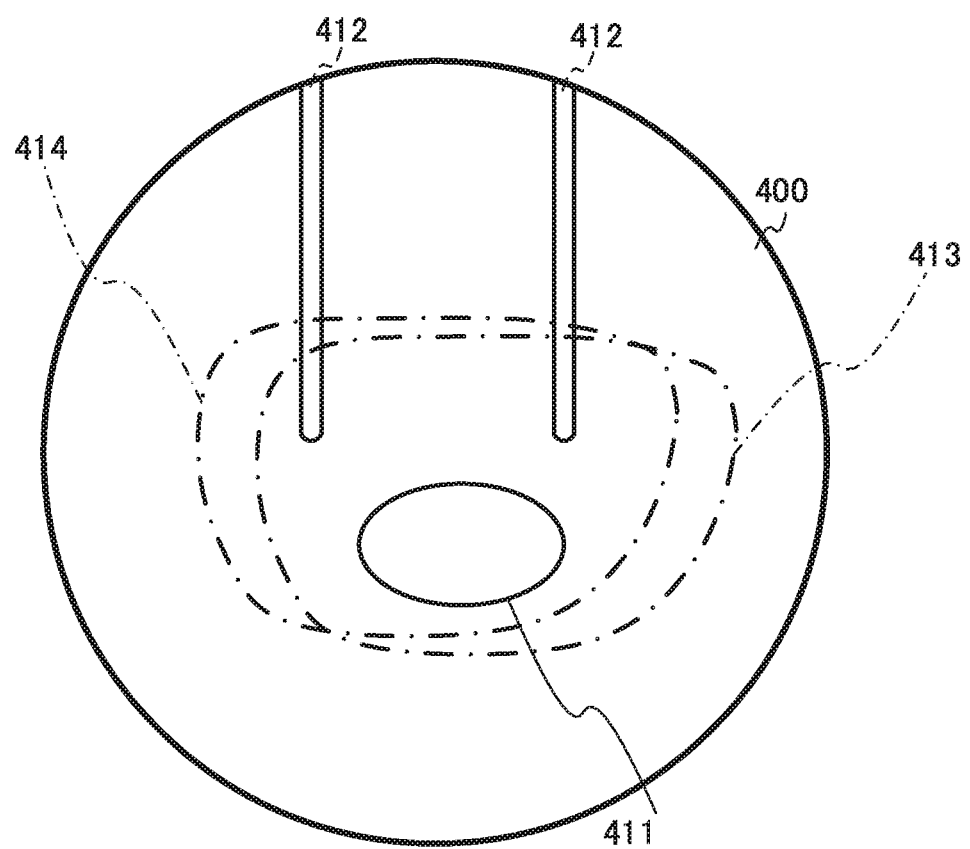
FIG. 5 is a front view of a lens blank.

In the following, the dimensions of the members disposed in the periphery of flexible substrate 200 and the relationship thereof will be described. FIG. 4 is a model diagram of relative positions and dimensions of electrodes 112 of liquid crystal lens 111, conductive pieces 300 and elongated conductor surfaces 221S and 231S in the periphery of lens 110 for a right eye. The direction indicated by the arrow in FIG. 4 is the direction in which edge portion 113 of lens 110 extends. Although the state in the periphery of lens 110 for a left eye is not shown in FIG. 4, the following description naturally applies to the periphery of lens 110 for a left eye 110 as well.

The length "$L_1$" of electrode 112 in the direction along edge portion 113 of lens 110 is generally 0.5 mm or more and 3 mm or less, and preferably 1.5 mm or more and 2.5 mm or less.

In the direction along edge portion 113, the length "$L_2$" of conductive piece 300 is shorter than the length "$L_3$" of each of elongated conductor surfaces 221S and 231S. The above configuration can prevent separation between conductive piece 300 and electrode 112 caused by conductive piece 300 being curved along the inner surface of front 130 together with flexible substrate 200 and being lifted from edge portion 113 when flexible substrate 200, conductive pieces 300 and lens 110 are assembled in front 130. Further, the contact pressure between conductive piece 300 and electrode 112 can be sufficiently increased, and conduction therebetween can be reliably ensured. For obtaining the above effects, in the direction along edge portion 113 of lens 110, the length "$L_2$" of conductive piece 300 is preferably 1 to 4 times, more preferably 1 to 2.5 times, and particularly preferably 2.5 times the length "$L_1$" of electrode 112. That is, it is particularly preferable that the relationship of the following formula 1 is satisfied:

$$L_2 = 2.5 L_1 \quad \text{(Formula 1).}$$

As described above, in the direction along edge portion 113, the length "$L_2$" of conductive piece 300 is equal to or longer than the length "$L_1$" of electrode 112. Accordingly, even when some error occurs in the assembly position of flexible substrate 200 and/or conductive piece 300 between lens 110 and front 130, conductive piece 300 can reliably contact electrode 112 and each of elongated conductor surfaces 221S and 231S.

Specifically, the length "$L_2$" of conductive piece 300 in the direction along edge portion 113 of lens 110 is preferably 0.5 mm or more and 7.5 mm or less, and more preferably 1.5 mm or more and 6.25 mm or less.

In addition, as shown by a broken line in FIG. 4, when lens 110 is cut out from a lens blank, the position of electrode 112 at edge portion 113 of lens 110 may vary depends on the positions of user's pupils (width between the pupils) and the shape of frame 120. This variation width "$L_4$" in the direction along edge portion 113 is generally 5 mm or more and 11 mm or less, preferably 9 mm or more and 11 mm or less. Therefore, the length "$L_3$" of each of elongated conductor surfaces 221S and 231S in the direction along edge portion 113 is preferably set to a dimension that satisfies the following formula 2:

$$L_3 = L_2 + L_4 \quad \text{(Formula 2).}$$

Satisfying such a relationship can more reliably bring conductive piece 300 into contact with each of elongated conductor surfaces 221S and 231S regardless of the variation in the position of electrode 112.

Specifically, the length $L_3$ of each of elongated conductor surfaces 221S and 231S in the direction along edge portion 113 is preferably 5.5 mm or more and 18.5 mm or less, and more preferably 10.5 mm or more and 17.25 mm or less.

The length "L3" of each of elongated conductor surfaces 221S and 231S is not necessarily be an exact sum of the length "$L_2$" of conductive piece 300 and the variation width "$L_4$" and some increase or decrease is naturally acceptable.

Although the embodiments of the present invention have been described above, the present invention is not limited to the above-described embodiments, and various modifications can be made without departing from the spirit of the present invention. For example, the eyewear according to the present invention includes glasses (including electronic glasses and sunglasses) and goggles all having an auxiliary mechanism for improving a user's visual acuity, such as a visual acuity correction lens. In addition, the eyewear according to the present invention includes various devices (for example, a glasses-type wearable terminal and a head-mounted display) having a mechanism for presenting information to the user's field of view or eyes.

The eyewear according to the present invention may be in any configuration as long as it can hold an auxiliary mechanism for improving visual acuity or field of view, a mechanism for presenting information, or the like in front of or around a wearer's eyes. The eyewear according to the present invention is not limited to a glasses type that can be worn on both ears, but may be a type that is worn on a head, one ear or the like. In addition, the eyewear according to the present invention is not limited to eyewear for both eyes, but may be eyewear for one eye.

In the eyewear according to the present invention, each lens may include a plurality of electric elements. For example, each lens may include a liquid crystal lens for electrochromic (light control) and a liquid crystal lens for presbyopia correction. In addition, each lens may include a plurality of liquid crystal lenses for vision correction so that the lens can correspond to multiple focal points. In these cases, four electrodes are disposed at the edge portion of each lens.

The number of electrodes included in one electric element is not limited to two, and may naturally be one or three or more.

This application is entitled to and claims the benefit of Japanese Patent Application No. 2017-178965 filed on Sep. 19, 2017, the disclosure of which including the specification, drawings and abstract is incorporated herein by reference in its entirety.

INDUSTRIAL APPLICABILITY

The present invention is suitably used as eyewear provided with a lens including an electric element.

REFERENCE SIGNS LIST

100 Electronic glasses (eyewear)
110 Lens
111, 411 Liquid crystal lens
112, 412 Electrode
113 Edge portion
120 Frame
130 Front
131 Rim
132 Bridge
133 Nose pad
140 Temple
141 Housing
142 Detection section
150 Control section
160 Power source
200 Flexible substrate
201 Insulating layer
202 Conductive wire layer
210 Connection portion
220 First conductive wire
221 First contact forming portion
221S First elongated conductor surface
222 Second contact forming portion
222S Second elongated conductor surface
230 Second conductive wire
231 Third contact forming portion
231S Third elongated conductor surface
232 Fourth contact forming portion
232S Fourth elongated conductor surface
300 Conductive piece
400 Lens blank
413 Cutting line
414 Second cutting line

What is claimed is:
1. An eyewear, comprising:
a lens including an electric element and an edge portion provided with an electrode of the electric element;
a frame including a control section for controlling the electric element, the frame holding the lens;
a conductive wire including an elongated conductor surface that extends along and faces the edge portion, the conductive wire being connected to the control section; and a conductive piece extending along and facing the edge portion, the conductive piece being in contact with the electrode and the conductor surface.

2. The eyewear according to claim 1, wherein:

the edge portion is provided with a plurality of the electrodes; and the eyewear includes a plurality of the conductive wires insulated from each other, and a plurality of the conductive pieces insulated from each other, and wherein the plurality of conductive pieces are in contact with the plurality of electrodes different from each other and a plurality of the conductor surfaces different from each other, respectively.

3. The eyewear according to claim 2, wherein:

the plurality of conductive wires are disposed in one cable.

4. The eyewear according to claim 2, wherein:

the lens includes a first lens and a second lens;

the plurality of conductive wires include a first conductive wire and a second conductive wire each including two conductor surfaces of the plurality of conductor surfaces; and the plurality of conductive pieces include a first conductive piece, a second conductive piece, a third conductive piece and a fourth conductive piece, and wherein the first conductive piece is in contact with a first electrode of the plurality of electrodes disposed at the edge portion of the first lens and with a first conductor surface of the plurality of conductor surfaces included in the first conductive wire;

wherein the second conductive piece is in contact with a first electrode of the plurality of electrodes disposed at the edge portion of the second lens and with a second conductor surface of the plurality of conductor surfaces included in the first conductive wire;

wherein the third conductive piece is in contact with a second electrode of the plurality of electrodes disposed at the edge portion of the first lens and with a first conductor surface of the plurality of conductor surfaces included in the second conductive wire; and wherein the fourth conductive piece is in contact with a second electrode of the plurality of electrodes disposed at the edge portion of the second lens and with a second conductor surface of the plurality of conductor surfaces included in the second conductive wire.

5. The eyewear according to claim 1, wherein:

the lens includes a plurality of the electric elements.

6. The eyewear according to claim 1, wherein:

the conductive piece has smaller Young's modulus than the lens.

7. The eyewear according to claim 1, wherein:

in a direction along the edge portion, the conductive piece is longer than the electrode and shorter than the elongated conductor surface.

8. The eyewear according to claim 7, wherein:

in the direction along the edge portion, a length "L2" of the conductive piece is 1 to 2.5 times a length "L1" of the electrode.

9. The eyewear according to claim 7, wherein:

in the direction along the edge portion, the length "L1" of the electrode, the length "L2" of the conductive piece, a length "L3" of the elongated conductor surface and a variation width "L4" of a position of the electrode satisfy formulas 1 and 2 below:

$$L2=2.5L1 \tag{Formula 1}$$

$$L3=L2+L4 \tag{Formula 2}.$$

10. The eyewear according to claim 9, wherein:

the length L1 is 0.5 mm or more and 3 mm or less, the length L2 is 0.5 mm or more and 7.5 mm or less, the length L3 is 5.5 mm or more and 18.5 mm or less, and the length L4 is 5 mm or more and 11 mm or less.

11. The eyewear according to claim 10, wherein:

the length L1 is 1.5 mm or more and 2.5 mm or less, the length L2 is 1.5 mm or more and 6.25 mm or less, the length L3 is 10.5 mm or more and 17.25 mm or less, and the length L4 is 9 mm or more and 11 mm or less.

\* \* \* \* \*